(12) United States Patent
Digabel

(10) Patent No.: US 6,944,477 B1
(45) Date of Patent: Sep. 13, 2005

(54) METHOD OF SELECTING SIGNALS COMPATIBLE

(75) Inventor: Patrick Digabel, Mondeville (FR)

(73) Assignee: Koninklijke Philips Electronics N.V., Eindhoven (NL)

(*) Notice: Subject to any disclaimer, the term of this patent is extended or adjusted under 35 U.S.C. 154(b) by 941 days.

(21) Appl. No.: 09/687,897

(22) Filed: Oct. 13, 2000

(30) Foreign Application Priority Data

Oct. 15, 1999 (FR) .................... 99 12925

(51) Int. Cl.[7] .............. H04B 1/38; H04M 1/00

(52) U.S. Cl. .............. 455/558; 455/505; 375/354; 340/825.02

(58) Field of Search .............. 455/502, 558, 455/559, 557, 550.1, 343; 375/354, 356; 331/49.55; 340/825, 825.02, 825.03; 370/537, 370/503

(56) References Cited

U.S. PATENT DOCUMENTS

| 4,853,653 A | | 8/1989 | Maher | |
|---|---|---|---|---|
| 5,357,146 A | * | 10/1994 | Heimann | 327/292 |
| 5,875,321 A | * | 2/1999 | Sengoku | 713/501 |
| 5,903,616 A | * | 5/1999 | Rangan et al. | 375/354 |
| 6,138,918 A | * | 10/2000 | Tarbouriech | 235/492 |
| 6,154,797 A | * | 11/2000 | Burns et al. | 710/52 |
| 6,265,930 B1 | * | 7/2001 | Walker et al. | 327/407 |

* cited by examiner

Primary Examiner—Nay Maung
Assistant Examiner—Edan Orgad
(74) Attorney, Agent, or Firm—Kevin Simons

(57) ABSTRACT

The invention relates to a method of selecting a signal among N signals, according to which method a validation signal associated with a signal to be selected is placed in an active state by means of a selection signal. The method according to the invention includes an attribution to each of the validation signals of the state of its associated selection signal when all the validation signals are in an inactive state. The invention enables to preserve the integrity of the duty cycle of the signal resulting from the selection thus carried out.

11 Claims, 3 Drawing Sheets

METHOD OF SELECTING SIGNALS COMPATIBLE

BACKGROUND OF THE INVENTION

The invention relates to a method of selecting a signal from among N signals, the selection taking place in that a validation signal associated with the signal to be selected is placed in an active state by means of a selection signal.

U.S. Pat. No. 4,853,653 describes a switching device designed to deliver an output signal selected among N input signals which carries out such a method. In this switching device, the validation signals result from a storage of selection signals associated therewith. If one of the validation signals is in an active state, i.e. at a logic level 1 in the description relating to the known device, the storage of the selection signals associated with the other validation signals is inhibited. This inhibition is only lifted after a given time period has elapsed following the moment at which one of the selection signals, i.e. the one which is associated with the validation signal which is in the active state, enters a passive state, i.e. from the logic level 1 to the logic level 0 in the description relating to the known device. The method used in the known switching device thus introduces a delay into the switching of the signals, i.e. there is a non-negligible time interval during which the output signal of the switching device does not correspond to any of the input signals. This means that the output signal has a zero duty cycle during several consecutive cycles of the relevant signal.

Such a latent period is not acceptable in a number of applications. In particular, if the switching device is used in an apparatus designed to exchange data with a smart card, which apparatus must then provide to the smart card a clock signal selected among N clock signals available in the apparatus, the clock signal provided to the chip card must comply with the provisions of a standard ISO/IEC 7816-3: 1997, which requires that the duty cycle of the relevant signal must always lie between 45% and 55%. According to the ISO/IEC 7816-3:1997 standard, only a single breach of this rule is acceptable in the course of one switching operation.

The selection method used in the known switching device will inevitably cause a succession of breaches of this rule on account of the inhibitions described above and is accordingly not compatible with the ISO/IEC 7816-3:1997 standard.

A suppression of the inhibition step would seem to provide a natural solution to this problem, but this generates other difficulties.

Indeed, if the selection signals switch at the same time when an active front commanding the storage of said signals occurs, the next state of the validation signals is unpredictable.

If, for example, the state of the selection signal associated with that one of the validation signals which was previously active has been detected, said validation signal will enter an inactive state. Now, if in this example the switching to the active state of the selection signal associated with the validation signal which should then enter an active state is not detected, owing to the fact that its switching occurs simultaneously with the active front commanding the storage, the associated validation signal will remain in the inactive state. In that case, all validation signals will be in the inactive state until the next active front commanding the storage of the selection signals appears. This will cause the appearance of a latent period during which the output signal of the switching device will twice have a zero duty cycle. Such a method is accordingly not compatible with the ISO/IEC 7816-3:1997 standard, either.

SUMMARY OF THE INVENTION

It is one of the objects present invention to remedy this drawback by proposing a method which, in the case described above, enables to generate a signal whose duty cycle does not breach the rules of standard ISO/IEC 7816-3:1997.

To this end, a method as described in the opening paragraph includes according to the invention, an attribution step in which the state of the associated selection signal is attributed to each of the validation signals, which attribution step is carried out when all the validation signals are in an inactive state.

According to this method, the attribution step is carried out as soon as it is detected that all validation signals are simultaneously in the inactive state, and that validation signal which should have entered the active state is given this state. Such a practically instantaneous correction enables to ensure that no significant disruption of the duty cycle of the output signal generated by the method according to the invention will appear in the case described above.

A switching of the selection signals occurring at the same time as an active front commanding the storage of said signals may give rise to other negative effects. If the change in the state of the selection signal associated with that one of the validation signals which was previously active was not detected owing to the fact that its switching was simultaneous with the active front commanding the storage, said validation signal will remain in the active state. If in this same case the switching to the active state of the selection signal associated with the validation signal which must subsequently enter an active state is detected, the associated validation signal will enter the active state. In that case, at least two validation signals will be in the active state until the next active front commanding the storage of the selection signals appears. This will lead to a latent period during which the output signal of the switching device can remain in the active state, and thus provide a duty cycle equal to one several times. This is in conflict with the rules of the ISO/IEC 7816-3:1997 standard, as was explained above.

It is another object of the present invention to remedy this disadvantage by proposing a method which, in the case described above, enables to generate a signal whose duty cycle does not infringe the provisions of the ISO/IEC 7816-3:1997 standard.

To this end, a method as described in the opening paragraph includes according to the invention, a reset step in which those validation signals which have not presented an active front since a given moment in time are reset into an inactive state, which step is carried out when at least two validation signals are simultaneously in an active state.

According to this method, the reset step is carried out as soon as it is detected that several validation signals are simultaneously in the active state, and that validation signal which was to enter the inactive state is given this state. Such an almost instantaneous correction enables to ensure that no significant disruption in the duty cycle of the output signal generated by the method according to the invention will appear in the case described above.

In one of its variants, the invention also relates to a method as described in the opening paragraph, which includes a reset step in which all validation signals which have not presented an active front since a given moment in time are reset to an inactive state, which step is carried out when one of the validation signals presents an active front.

Such a variant enables to dispense with the identification of the states of the various validation signals. It suffices to determine which one has presented an active front most recently, all the others then being reset to the inactive state.

The invention also relates to a method of selecting a signal among N signals, in which method a validation signal associated with the signal to be selected is put in an active state by means of a selection signal, and which method includes attribution and reset steps as described above.

Such a method, when used in a switching device, enables to generate an output signal which is highly resistant to negative effects which may arise when the selection signals and the active front commanding the storage of said signals appear simultaneously.

As was noted above, the invention also relates to a method enabling a chip card to exchange data with an apparatus, wherein a clock signal selected among N clock signals supplied by the apparatus is transmitted to the chip card, which method is characterized in that it utilizes for this purpose a method as described above.

In one of its embodiments, the invention also relates to a switching device designed to deliver at an output a signal selected among N input signals when a validation signal associated with said input signal has been placed in an active state by means of an associated selection signal, which device includes:
 attribution means capable of attributing to each of the validation signals the state of its associated selection signal, which means are intended to be activated when all the validation signals are in an inactive state, and
 reset means capable of resetting to an inactive state those of the validation signals which have not presented an active front since a given moment in time, which means are intended to be activated when at least two validation signals simultaneously have an active state.

The invention is particularly suited to the selection of clock signals which are to be supplied to a smart card. The invention accordingly also relates to an apparatus intended to exchange data with a smart card, and especially supplying thereto a clock signal selected among N clock signals, which machine is characterized in that it comprises a switching device as described above.

BRIEF DESCRIPTION OF THE DRAWINGS

The invention will be better understood from the following description which is given by way of example, to which the invention is by no means limited, with reference to the attached drawings, in which.

DESCRIPTION OF THE PREFERRED EMBODIMENTS

Figure 1:
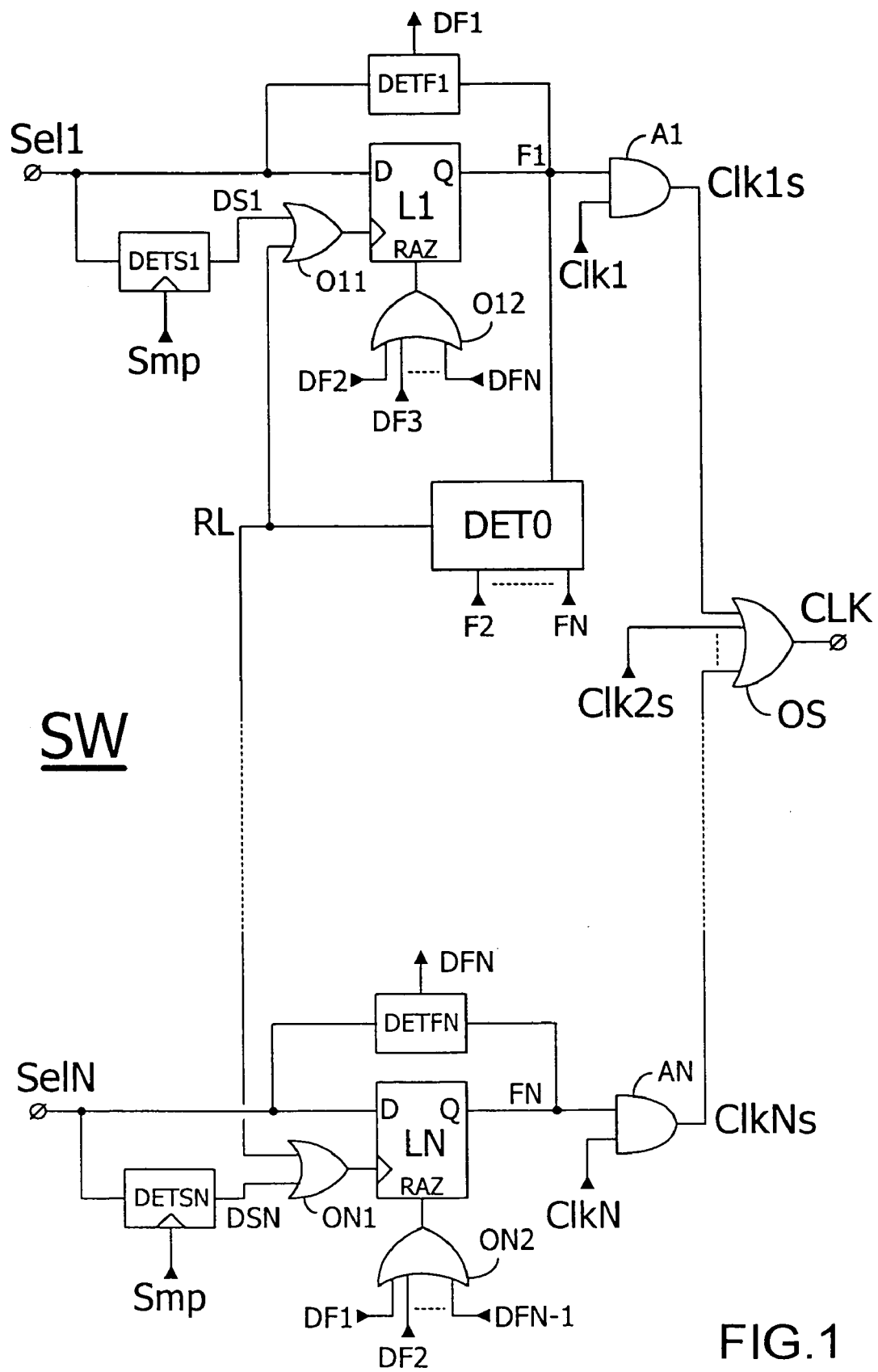
FIG. 1 is a partial operational diagram representing a switching device in which a method according to the invention is utilized.

FIG. 1 shows a switching device SW according to a preferred embodiment of the invention. This switching device SW is intended to deliver at an output CLK a signal Clki selected among N input signals Clk1 . . . ClkN, when a validation signal Fi (with i=1 to N) associated with said input signal Clki has been placed in an active state by means of an associated selection signal Seli. This device comprises:
 attribution means (O11 . . . ON1) capable of attributing to each of the validation signals Fi (with i=1 to N) the state of its associated selection signal Seli, which means are intended to be activated when all the validation signals F1 . . . FN are in an inactive state, and
 reset means (O12 . . . O1N) capable of resetting to an inactive state those of the validation signals which have not presented an active front since a given moment in time, which means are intended to be activated when at least two validation signals simultaneously present an active state.

In this embodiment, the switching device SW in addition comprises:
 detection means DETFi (with i=1 to N) for detecting fronts of the selection signals Sel1 . . . SelN, and
 memory means Li (with i=1 to N) for storing the state of the selection signals Sel1 . . . SelN, which means are intended to be activated by the active fronts of said signals and to deliver the validation signals F1 . . . FN.

The memory means in this embodiment are formed by simple D latches.

In this embodiment, the switching device SW in addition comprises detection means DET0 for detecting whether all the validation signals F1 . . . FN are simultaneously in the inactive state, which detection means are intended to control the attribution means (O11 . . . ON1).

This switching device SW also comprises detection means DETFi (with i=1 to N) for detecting active fronts of the validation signals F1 . . . FN, which detection means are intended to control the reset means (O12 . . . O1N).

The operating principle of this switching device SW is as follows: when a selection signal Seli is in the active state, represented here by a logic level 1, given the nature of the memory means, this active state is stored in the latch Li, and the validation signal Fi is in the active state. In a normal operational mode, the other selection signals Sel1 . . . Seli−1, Seli+1 . . . SelN are in the inactive state, i.e. at the logic level 0, and the validation signals F1 . . . Fi−1, Fi+1 . . . FN associated therewith are also the inactive state. These validation signals two inputs AND gates A1 . . . Ai−1, Ai+1 . . . AN, whose output signals Clk1s . . . Clk(i−1)s, Clk(i+1)s . . . ClkNs are then kept in the inactive state. Only one AND ET Ai is not inhibited owing to the fact that the validation signal Fi is in the active state, said AND gate Ai delivering the input signal Clki at an output. This signal is transmitted to an input of an OR gate OS having N inputs of which the N−1 remaining inputs are connected to the outputs of the other AND gates A1 . . . Ai−1, Ai+1 . . . AN. The switching device SW thus provides an output signal CLK, which is the same as the input signal Clki which has been selected among the N input signals Clk1 . . . ClkN, by placing validation signal Fi associated with the input signal Clki in an active state by means of the selection signal Seli.

The storage of the state of a selection signal Seli (with i=1 to N) is carried out as follows: when said selection signal changes from an inactive state to an active state, a front detection device DETSi associated with said selection signal Seli delivers a signal DSi which presents an active front, i.e. a rising edge in this embodiment. This active front arrives at a clock input of the D latch Li intended to store the state of the selection signal Seli, via an OR gate Oi1, with a certain delay with respect to the moment when said selection signal has changed its state. The active state of the selection signal Seli can thus be stored in the D latch Li.

The front detections carried out by the detection devices DETS1 . . . DETSN necessarily make use of a sampling signal Smp. This signal Smp will advantageously be formed by that one of the input signals Clk1 . . . ClkN whose frequency is lowest. If two selection signals Seli and Selj switch at the same time at which an active front of said sampling signal Smp occurs, the new states of said signals Seli and Selj may not to be correctly stored in the D latches Li and Lj associated therewith. Indeed, a change-over from the inactive state to the active state, or vice versa, could be ignored, since the corresponding front has appeared simultaneously with that of the sampling signal Smp according to the present assumption.

Let us assume that selection signals Seli and Selj were previously active and inactive, respectively, then two situations which are potentially detrimental to the correct functioning of the switching device SW may arise.

In a first situation, the change in state of the selection signal Seli will have been detected while the change in state of the signal Selj has not been detected. In this case, all the validation signals will be inactive, and the output signal CLK of the switching device SW is kept in the inactive state. The implementation of an attribution step included in the selection method according to the invention enables to avoid that such a situation affects the duty cycle of the output signal CLK. Indeed, the fact that the validation signals F1 . . . FN are simultaneously inactive is immediately detected by the detection means DET0, which supply a signal RL which then presents an active front. This active front is simultaneously transmitted to the clock input of each D latch Li (with i=1 to N), and each D latch then carries out a new storage of its associated selection signal Seli. At the end of this attribution step, the only validation signal Fj in the active state is the signal associated with that one of the selection signals Sel1 . . . SelN which is in the active state, in this case Selj.

The entire attribution step takes place asynchronously, and thus practically instantaneously, so that the latent period during which all the validation signals F1 . . . FN are in an inactive state will be so short that it will have no significant influence on the duty cycle of the output signal CLK of the switching device SW.

A second situation which is potentially detrimental to a correct functioning of the switching device SW arises when, with the selection signals Seli and Selj being previously active and inactive, respectively, the change in state of the selection signal Selj has been detected whereas the change in state of the signal Seli has not been detected. In this case two validation signals are active, and the output signal CLK of the switching device SW may remain in the active state during a period of the sampling signal Smp, which period may be much longer than half the period of the output signal CLK of the switching device SW. The implementation of a reset step included in the selection method according to the invention enables to avoid that such a situation affects the duty cycle of the output signal CLK. Indeed, the fact that the validation signals Fi and Fj are simultaneously active is immediately detected by the detection means DETFi (with i=1 to N). Only the detection module DETFj identifies an active front of its associated validation signal Fj, because only the selection signal Selj has shown an active front, passing from the inactive to the active state. Said module DETFj supplies a signal DFj, which then presents an active front, to N−1 OR gates O12 . . . O(j−1)2, O(j+1)2 . . . ON2 having N−1 inputs. The outputs of these logic gates are connected to the respective reset inputs of the latches L1 . . . Lj−1, Lj+1 . . . LN. The active front of the signal DFi resets the outputs of said D latches to the inactive state, and thus also the validation signals F1 . . . Fj−1, Fj+1 . . . FN. At the end of this reset step, only the validation signal Fj associated with the active one among the selection signals Sel1 . . . SelN will be in the active state, in this case Selj.

The entire reset step takes place asynchronously, and thus practically instantaneously, so that the latent period during which at least two validation signals F1 FN are in an active state simultaneously will be so short that it cannot have any significant influence on the duty cycle of the output signal CLK of the switching device SW.

Figure 2:
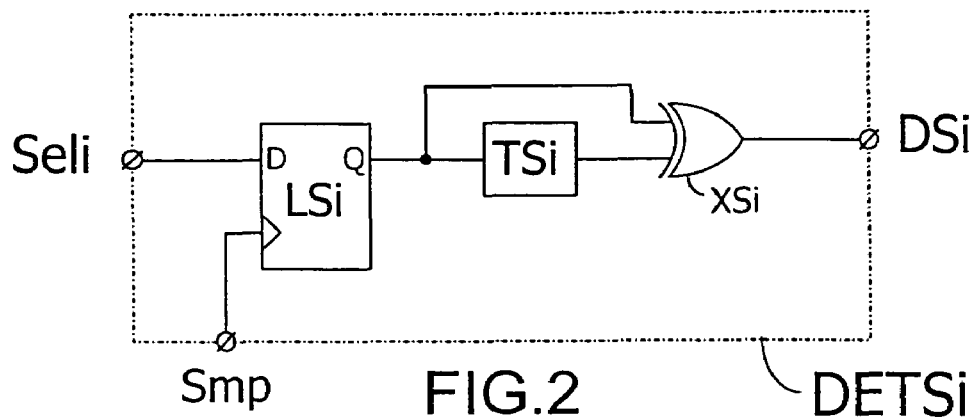
FIG. 2 is a circuit diagram of a detection module present in such a switching device.

FIG. 2 illustrates a possible embodiment of a front detector DETSi incorporated in the front detection means for the selection signals Sel1 . . . SelN. This front detector comprises in the present example:
  a D latch LSi provided with a data input D intended to receive one of the selection signals Seli, with a clock input intended to receive the sampling signal Smp, and with a data output Q, and
  an EXCLUSIVE OR gate XSi provided with an input which is directly connected to the data output Q of the D latch LSi, with another input connected to the data output Q of the D latch LSi via a delay cell TSi, and with an output which constitutes the output of the front detector DETSi.

This detector operates as follows: the state of the selection signal Seli is stored upon each active front of the sampling signal Smp. When the data output Q of the D latch LSi changes its state, following a change in state of the selection signal Seli, this change is instantaneously transmitted to one of the inputs of the EXCLUSIVE OR gate XSi, while the other input remains in the previous state of the data output Q of the D latch LSi for the duration of the delay induced by the delay cell TSi. During this delay time, therefore, the output of the EXCLUSIVE OR gate XSi will be in an active state and will thus deliver a signal DSi showing an active front when a front of the selection signal Seli has been detected.

Figure 3:
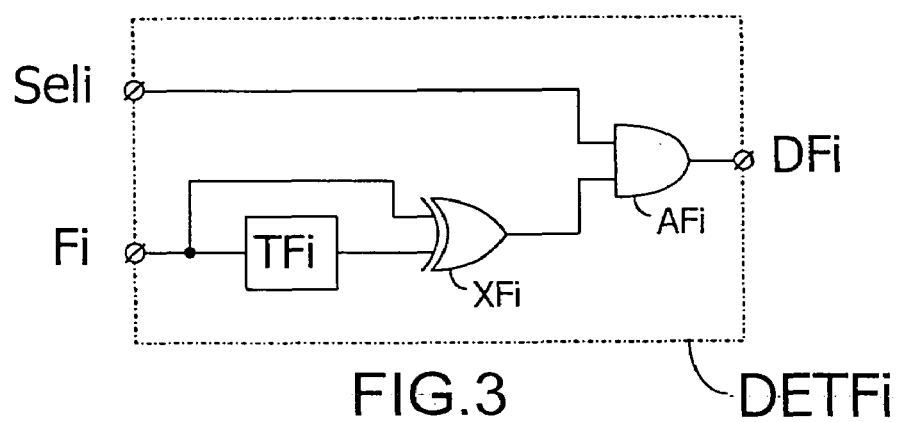
FIG. 3 is a circuit diagram of an alternative detection module present in such a switching device.

FIG. 3 shows an embodiment of an active front detector incorporated in the detection means for active fronts of the validation signals. This active front detector comprises:
  an EXCLUSIVE OR gate XFi provided with an input intended to receive one of the validation signals Fi directly, with another input designed to receive said validation signal Fi via a delay cell TFi, and with an output, and
  an AND gate AFi provided with an input intended to receive the selection signal Seli associated with the validation signal Fi, with another input connected to the output of the EXCLUSIVE OR gate XFi, and with an output which forms the output of the active front detector DETFi.

This detector operates as follows: when the state of the validation signal Fi changes, this change is instantaneously transmitted to one of the inputs of the EXCLUSIVE OR gate XFi, while the other input remains in the previous state of the validation signal Fi for the duration of the delay induced by the delay cell DFi. During this delay time, therefore, the output of the EXCLUSIVE or gate XFi assumes an active state and accordingly supplies a signal presenting an active front when a front of the selection signal Fi has been detected. This active front will only be present in the output signal DFi of the detector after its passage through the AND gate AFi, and accordingly under the condition that the associated selection signal Seli itself has assumed an active state, i.e. exclusively if the change in state of the validation signal Fi does correspond to an active front.

In an alternative embodiment, the input of the AND gate AFi not connected to the output of the EXCLUSIVE OR gate XFi may be wired so that it receives the validation signal Fi instead of the selection signal Seli.

Figure 4:
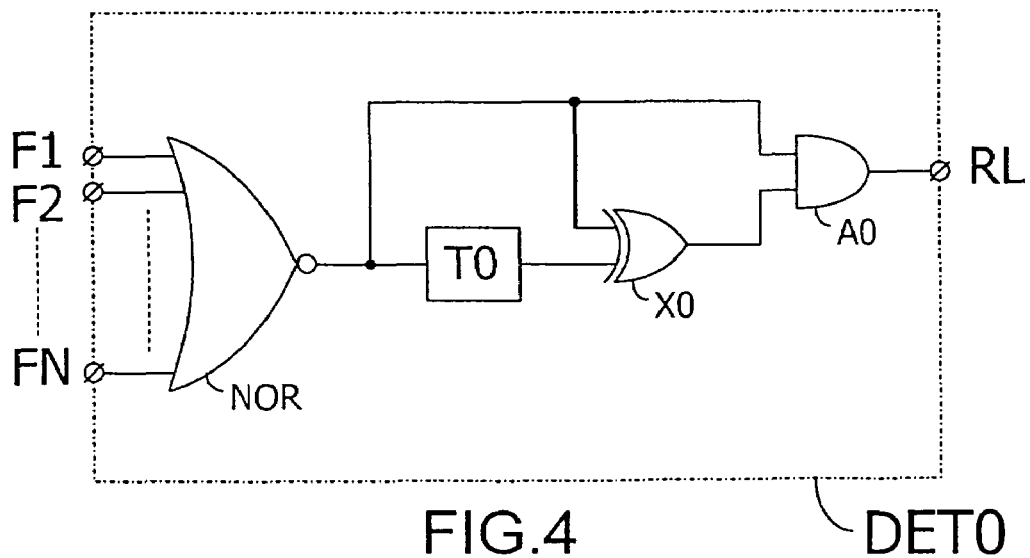
FIG. 4 is a circuit diagram of yet another detection module present in such a switching device.

FIG. 4 shows an embodiment of detection means DET0 for detecting that all the validation signals F1 ... FN are inactive simultaneously. These detection means comprise:
- a NOR gate provided with N inputs intended to receive the N validation signals F1 ... FN, and with an output,
- an EXCLUSIVE OR gate X0 provided with an input which is directly connected to the output of the NOR gate, with another input connected to said output of the NOR gate via a delay cell T0, and with an output, and
- an AND gate A0 provided with an input connected to the output of the NOR gate, with another input connected to the output of the EXCLUSIVE OR gate X0, and with an output which forms the output of the detection means DET0.

These detection means DET0 operate as follows: when the output signal of the NOR gate changes its state, this change is instantaneously transmitted to one of the inputs of the EXCLUSIVE OR gate X0, while the other input remains in the previous state of the output of the NOR gate for the duration of the delay induced by the delay cell T0. During this delay time, therefore, the output of the EXCLUSIVE OR gate X0 assumes an active state and thus delivers a signal presenting an active front when a front of the signal present at the output of the NOR gate has been detected. This active front will only be present in the output signal RL of the detection means DET0 after its passage through the AND gate A0, and accordingly under the condition that the output signal of the NOR gate itself has entered an active state, i.e. only if all the selection signals are in an active state.

Alternative embodiments of the detection means described with reference to FIGS. 2 to 4 are quite conceivable. For example, if the active and inactive states are chosen to correspond to the logic levels 0 and 1, respectively, rather than to the logic levels 1 and 0 as described above, it is obvious that other logic functions will have to be used, in accordance with the Morgan theorems. Such modifications and adaptations are known to those skilled in the art.

Figure 5:
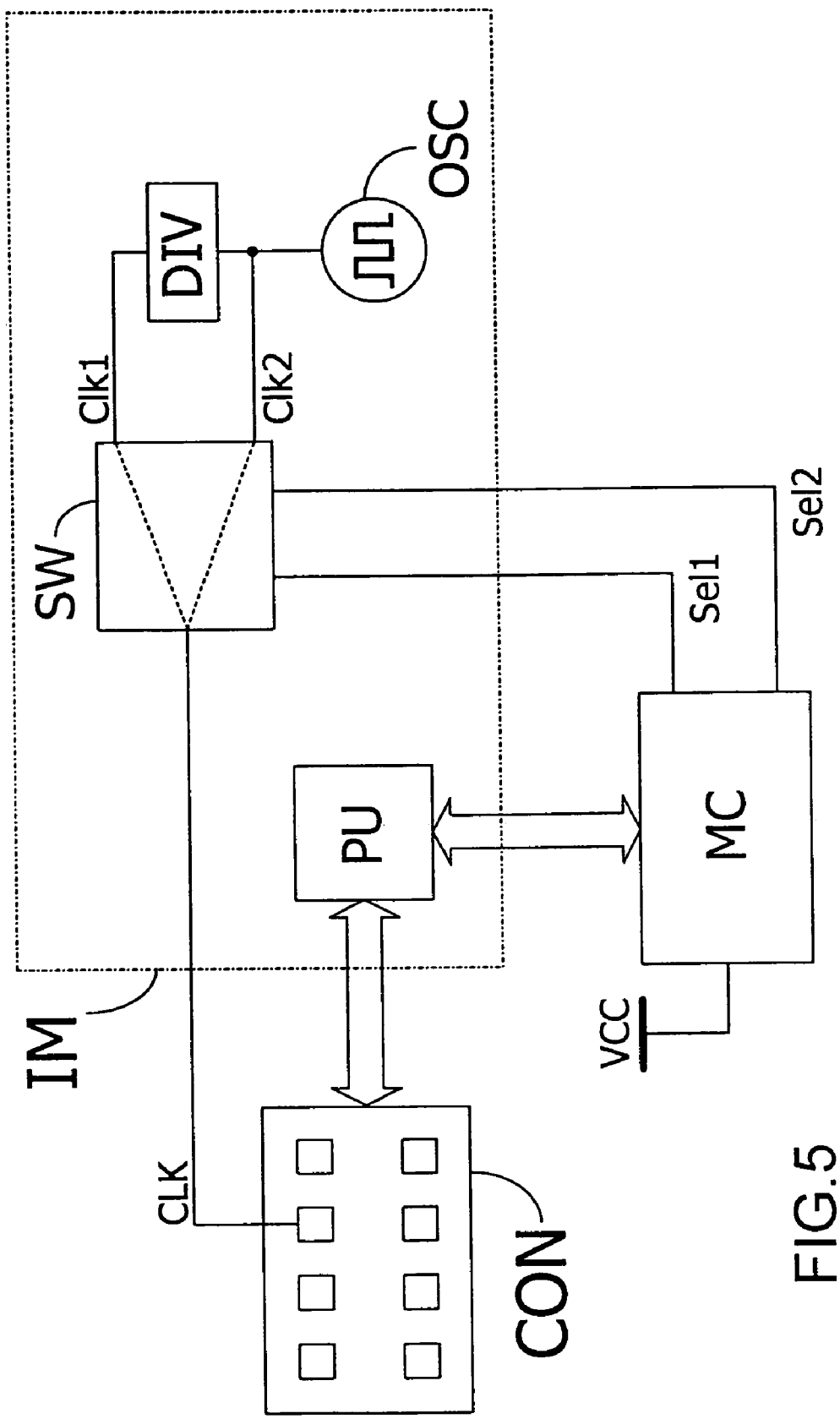
FIG. 5 is a block diagram representing an apparatus comprising such a switching device.

FIG. 5 diagrammatically shows an apparatus intended to communicate with a smart card, which apparatus comprises:
- a connector CON intended to be electrically connected to an integrated circuit present on the surface of said smart card and having at least one contact pad, called clock pad, which is designed to supply to said integrated circuit a clock signal CLK,
- a microprocessor MC intended to exchange data with said integrated circuit, and
- an interface module IM arranged between the connector CON and the microprocessor MC, comprising an oscillator OSC followed by a frequency divider DIV, and a processing unit PU, which module enables an exchange of data between the microprocessor MC and the integrated circuit.

An output of the frequency divider DIV supplies a transitory clock signal Clk1, while the oscillator OSC provides a permanent clock signal Clk2.

The interactions between the machine and the smart are described in the standard ISO/IEC 7816-3:1997.

A so-called activation phase of the smart card takes place in two stages: in a first operation mode called transitory operation mode, the system formed by the joining together of the smart card and the apparatus is not yet operational. The apparatus must first detect the presence of the smart card, then put the integrated circuit present at the surface thereof into its nominal operating conditions, i.e. inter alia provide it with a supply voltage, or also initialize data paths so that the integrated circuit can communicate with the apparatus. In a second operation mode called permanent operation mode, the integrated circuit is supplied with a voltage and receives a permanent clock signal at an operational frequency, and the data paths are ready to transmit information between the integrated circuit and the apparatus. During the transitory operation mode, the integrated circuit must receive the transitory clock signal Clk1, whose frequency may be different from the operational frequency. It is preferable to use a signal having a frequency lower than the operational frequency, which enables to reduce the energy consumption of the integrated circuit during the transitory operation. Such a choice is particularly advantageous in applications in which the power source used for giving the integrated circuit its supply voltage is a battery, such as is usually the case in portable equipment. The system must thus perform a switch-over of the signal CLK transmitted as the clock signal to the integrated circuit present at the surface of the smart card at the end of the transitory operation. This switch-over is realized by a switching device SW incorporated in the interface module IM which, upon the reception of a command in the form of a change in state of selection signals Sel1 and Sel2, replaces the transitory clock signal Clk1, which formed the integrated circuit's clock signal CLK during the transitory operation mode, with the permanent clock signal Clk2, which is intended to constitute the clock signal CLK for the integrated circuit during the permanent operation mode.

The use for this purpose of a switching device SW in which a selection method according to the invention is implemented enables to guarantee that the switching operations carried out by said switching device will comply with those of the provisions of the above mentioned ISO/IEC 7816-3:1997 standard which relate to the integrity of the duty cycle of the clock signal CLK provided by the apparatus to the integrated circuit present at the surface of the smart card.

What is claimed is:

1. A method of selecting a signal among N signals, the selection taking place in that a validation signal associated with the signal to be selected is placed in an active state by means of a selection signal, which method comprises a reset step in which those validation signals which have not presented an active front since a given moment in time are reset to an inactive state, which reset step is carried out when at least two validation signals are simultaneously in an active state.

2. A method of selecting a signal among N signals, the selection taking place in that a validation signal associated with the signal to be selected is placed in an active state by means of a selection signal, which method includes a reset step in which all validation signals which have not presented an active front since a given moment in time are reset to an inactive state, which reset step is carried out when one of the validation signals presents an active front.

3. A method of selecting a signal among N signals, the selection taking place in that a validation signal associated with the signal to be selected is placed in an active state by means of a selection signal, which method includes an attribution step in which the state of the associated selection signal is attributed to each of the validation signals, which attribution step is carried out responsive to all the validation signals being in an inactive state further comprising a reset step in which all validation signals which have not presented an active front since a given moment in time are reset to an inactive state, which reset step is carried out when one of the validation signals presents an active front.

4. The method as claimed in claim 3, wherein the signal selected from among the N signals is a clock signal; and wherein the clock signal is supplied from a machine to a chip card, thereby enabling data to be exchanged between the chip card and the machine.

5. A switching device designed to deliver at an output a signal selected among N input signals when a validation signal associated with said input signal has been placed in an active state by means of an associated selection signal, which device includes:
   attribution means capable of attributing to each of the validation signals the state of its associated selection signal, which means are intended to be activated when all the validation signals are in an inactive state, and
   reset means capable of resetting to an inactive state those of the validation signals which have not presented an active front since a given moment in time, which means are intended to be activated when at least two validation signals simultaneously have an active state.

6. The switching device as claimed in claim 5, wherein it comprises in addition:
   detection means for detecting active fronts of the selection signals, and
   memory means for storing the state of the selection signals, which means are intended to be activated by the active fronts of said signals and to deliver the validation signals.

7. The switching device as claimed in claim 6, wherein it comprises in addition:
   detection means for detecting that all the validation signals are simultaneously inactive, which detection means are intended to control the attribution means.

8. The switching device as claimed in claim 6, wherein it comprises in addition:
   detection means for detecting fronts of the validation signals, which detection means are intended to control the reset means.

9. The switching device as claimed in claim 5, wherein the switching device is incorporated in an apparatus adapted to exchange data with a smart card, and is further adapted to supply to the smart card a clock signal selected from among N clock signals.

10. The switching device of claim 7, wherein the detection means for detecting that all the validation signals are simultaneously inactive comprises a delay cell.

11. The switching device of claim 8, wherein the detection means for detecting fronts of the validation signals comprises a delay cell.

* * * * *